(12) United States Patent
Tayouri et al.

(10) Patent No.: US 10,689,071 B2
(45) Date of Patent: Jun. 23, 2020

(54) STABILIZED FLOATING PLATFORM STRUCTURE

(71) Applicant: Elta Systems Ltd., Ashdod (IL)

(72) Inventors: Feri Tayouri, Ashdod (IL); Gregory Geyshis, Ramat Gan (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 16/204,447

(22) Filed: Nov. 29, 2018

(65) Prior Publication Data

US 2019/0176939 A1  Jun. 13, 2019

(30) Foreign Application Priority Data

Dec. 12, 2017  (IL) .......................................... 256290

(51) Int. Cl.

| | |
|---|---|
| *B63B 35/44* | (2006.01) |
| *B63B 1/10* | (2006.01) |
| *F03B 13/18* | (2006.01) |
| *F03B 13/20* | (2006.01) |
| *B63B 39/02* | (2006.01) |
| *B63B 22/02* | (2006.01) |
| *B63B 21/50* | (2006.01) |
| *B63B 39/06* | (2006.01) |
| *B63B 39/08* | (2006.01) |

(52) U.S. Cl.
CPC .............. *B63B 35/44* (2013.01); *B63B 1/107* (2013.01); *B63B 39/02* (2013.01); *F03B 13/1815* (2013.01); *F03B 13/20* (2013.01); *B63B 21/50* (2013.01); *B63B 22/02* (2013.01); *B63B 39/06* (2013.01); *B63B 39/08* (2013.01); *B63B 2021/505* (2013.01); *B63B 2035/442* (2013.01); *B63B 2035/4426* (2013.01); *B63B 2035/4466* (2013.01); *B63B 2035/4473* (2013.01); *F05B 2240/40* (2013.01); *F05B 2260/406* (2013.01)

(58) Field of Classification Search
CPC ......... B63B 35/44; B63B 39/02; B63B 39/06; B63B 39/08; B63B 1/107; F03B 13/1815; F03B 13/20
See application file for complete search history.

(56) References Cited

U.S. PATENT DOCUMENTS

| | | | |
|---|---|---|---|
| 1,018,678 A | 2/1912 | Nelson | |
| 3,029,606 A * | 4/1962 | Olsen | ...................... E02B 15/08 405/27 |

(Continued)

FOREIGN PATENT DOCUMENTS

| | | |
|---|---|---|
| DE | 102010053244 A1 | 6/2012 |
| EP | 2781732 A1 | 9/2014 |

*Primary Examiner* — Stephen P Avila
(74) *Attorney, Agent, or Firm* — Dorsey & Whitney LLP

(57) ABSTRACT

A floating structure is described. The floating structure includes a floating platform disposed at a water surface, a mooring system and a damping system. The mooring system is configured for mooring one side of the floating platform to a sea floor, thereby to permit rotation of the floating structure and to provide a desired orientation down-wind with respect to an anchor point. The damping system is arranged at one side of the floating platform and is configured for absorbing wave energy and stresses imparted by the motion of waves in order to stabilize a horizontal position of the floating structure down-wind during a storm against the waves.

18 Claims, 1 Drawing Sheet

(56) References Cited

U.S. PATENT DOCUMENTS

| | | | | |
|---|---|---|---|---|
| 3,444,693 A | * | 5/1969 | Busey | E02B 3/062 |
| | | | | 405/27 |
| 3,507,238 A | | 4/1970 | Chow | |
| 3,568,620 A | | 3/1971 | Douglas | |
| 3,592,155 A | | 7/1971 | Rosenberg | |
| 4,582,014 A | * | 4/1986 | Patel | B63B 43/06 |
| | | | | 114/122 |
| 4,622,473 A | | 11/1986 | Curry | |
| 4,931,662 A | | 6/1990 | Burton | |
| 4,984,935 A | * | 1/1991 | de Oliveira Filho | B63B 35/44 |
| | | | | 405/224 |
| 2009/0293506 A1 | * | 12/2009 | Ryu | F17C 3/025 |
| | | | | 62/53.1 |

* cited by examiner

STABILIZED FLOATING PLATFORM STRUCTURE

TECHNOLOGICAL FIELD

This invention relates generally to offshore floating platforms, and more particularly to stabilized floating platforms for use in deep water.

BACKGROUND

As the world population increases and large cities expand over crowded shores, offshore platforms have become an acceptable location for urban, strategic and commercial activities. In particular, offshore platforms can be used for a variety of applications, such as offshore islands that may support industrial buildings and dwelling houses, deep-water drilling equipment for scientific purposes, and oil and gas recovery installations. Offshore platforms can also be used as a location for offshore radar stations, airports, and other facilities for industrial activity and urban life.

In general, offshore platforms are divided into two groups, such as "fixed" platforms and "floating" platforms. Fixed platforms comprise an equipment deck, that is supported above the water by legs that extend down to and are seated on the sea floor. While relatively stable, such fixed platforms are typically limited to shallow waters, i.e., depths of about 150 meters or less. Floating platforms are typically employed in water depths of 150 meters and greater, and are held in position over the well site by mooring lines or chains anchored to the sea floor, or by motorized thrusters located on the sides of the platform, or by both. Although floating platforms are more complex to operate because of their greater movement in response to wind and wave conditions, they are capable of operating at substantially greater depths than fixed platforms. Floating platforms are also more mobile, and hence easier to move to other offshore well sites.

One of the known types of floating platforms is a platform of the floating barge type. Floating barges present a relatively large water plane area and are immersed slightly below the surface of the water, i.e. at a depth where wave action is most prevalent. The common problem with such barge platforms is that it is difficult to perform useful work from the decks thereof due to waves which wet the decks and which cause a rolling, pitching and yawing reaction of the vessel, rendering the barges unsatisfactory for most operations where stability of the platform is paramount.

Stability can be required, for example, when the floating platform is used as a location for offshore radar stations or when airplanes and helicopters land on the platform. To address such stability issues, so-called "semi-submersible" offshore platforms were designed that take into consideration that wind waves of ocean storms are relatively only surface disturbances of the ocean and do not create significant water movements at a depth of about 15 meters and greater. Conventional semi-submersible offshore platforms are used primarily in offshore locations where the water depth exceeds about 100 meters. This type of platform comprises a hull structure that has sufficient buoyancy to support the equipment deck above the surface of the water. The hull typically comprises one or more submersible "pontoons" that support a plurality of vertically upstanding struts or columns, which in turn support the deck above the surface of the water.

For example, U.S. Pat. No. 3,592,155 is directed to providing a flotation platform for diminishing its reaction to surface wave action and turbulence and is formed of a planar deck section supported by a plurality of buoyantly independent elongate wine bottle-shaped flotation modules cast of a homogeneous unitized material, such as concrete. Thus, the structure ensures a minimal adverse reaction to surface wave turbulence since the neck portion extending through the area of surface wave turbulence is of a small cross-sectional area.

Although such conventional offshore floating platforms can enhance stability of the platform impacted by relatively small waves with the height of less than about 5 meters, such structures cannot provide stable operation of the platforms, when they are affected by harsh weather conditions, such as oceanic storms and strong waves which are greater than 5 meters.

GENERAL DESCRIPTION

Thus, despite prior art in the area of stabilized floating platforms used in deep water, there is still a need in the art to provide a novel floating platform structure that can provide stable operation of the platform struck by strong waves.

The present invention partially eliminates disadvantages of the above reference techniques and provides a novel floating structure. According to an embodiment of the present invention, the floating structure includes a floating platform disposed at a water surface, a mooring system and a damping system. The mooring system is configured for mooring one side of the floating platform to a sea floor, thereby to permit rotation of the floating structure and to provide a desired orientation down-wind with respect to an anchor point. The damping system is arranged at one side of the floating platform and is configured for absorbing wave energy and stresses imparted by the motion of waves in order to stabilize a horizontal position of the floating structure down-wind during a storm against the waves.

According to an embodiment of the present invention, the floating structure includes a deck disposed above the water surface. The deck has a desired payload for industrial activity and urban life. The floating structure also includes a floating base disposed under the water surface, and configured for holding the deck. The floating structure also includes strut elements extending from the float base configured for supporting the deck under the water surface.

According to an embodiment of the present invention, the floating base includes a plurality of removable buoyancy units connected to the deck via the strut elements. Each buoyancy unit is independent from others, and includes a pontoon configured to displace enough water in order to create a buoying force greatly in excess of the weight of the buoyancy unit. A number and concentration of the buoyancy units is such that an entire volume of the buoyancy units is well below the area of wave action.

According to an embodiment of the present invention, the strut elements have a suitable length to provide sufficient clearance over the water surface to meet the requirement that waves with a height of less than about 10 meters do not reach the deck.

According to an embodiment of the present invention, the mooring system includes a single-point anchoring system. The single-point anchoring system includes an anchor resting (i.e., located in a fixed position) on the sea floor, and an anchor-connecting element configured for providing direct connection of the floating platform to the anchor.

According to another embodiment of the present invention, the mooring system includes an anchor resting on the sea floor, an anchor-connecting element configured for providing connection of the floating platform to the anchor, and a shock absorbance buoy configured to assist in carrying the weight of the anchor-connecting element and to absorb stream, wind and the wave shock associated with the impact of incoming stream, wind and waves. The anchor-connecting element is connected to the shock absorbance buoy and extends downwardly therefrom to the sea floor, where it is secured thereto at its lower end by using the anchor resting on the sea floor at the anchor point. The shock absorbance buoy is connected to opposite ends of the one side of the semi-submersible platform, thereby to provide a desired orientation down-wind with respect to the anchor point.

According to an embodiment of the present invention, the damping system includes a set of floating bodies configured to float up and down independently along with the waves on the water surface and at a depth where wave action is most prevalent. The floating bodies are arranged in rows, which are parallel to one side of the floating structure and are perpendicular to the direction of the incoming waves. The rows extend apart from said one side, along the direction of the incoming waves. Each row includes a plurality of floating bodies. In each row, the floating bodies are shifted with respect to the floating bodies of the neighboring rows to provide shielding of said one side from direct impact of the incoming waves.

According to an embodiment of the present invention, the damping system includes levers associated with the floating bodies and a rotary shaft arranged on the semi-submersible platform. The floating bodies are connected to the rotary shaft by using the levers. Each lever has a suitable shape to be connected to the corresponding floating body at one end of the lever and to the rotary shaft at its other end, thereby to provide pivotal motion along an axis of the rotary shaft.

According to an embodiment of the present invention, the floating bodies have a cylindrical shape, however other shapes are also contemplated. A cylindrical floating body can have a size in the cross-section area of the cylinder in the range of 1 meter to 50 meters and a length of the cylinders in the range of 1 meter to 100 meters.

According to an embodiment of the present invention, weight of the floating bodies is in the range of 100 kg to 1000 tons.

According to an embodiment of the present invention, the number of the floating bodies in each row is governed by the length of the side, while a number of the rows extending from said one side of the floating structure is governed by the length of the incoming waves. For example, the number of the rows is in the range of 1 to 6.

According to an embodiment of the present invention, at least one floating body is located on a crest of incoming waves and at least one another floating body is located on a trough of the incoming waves.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
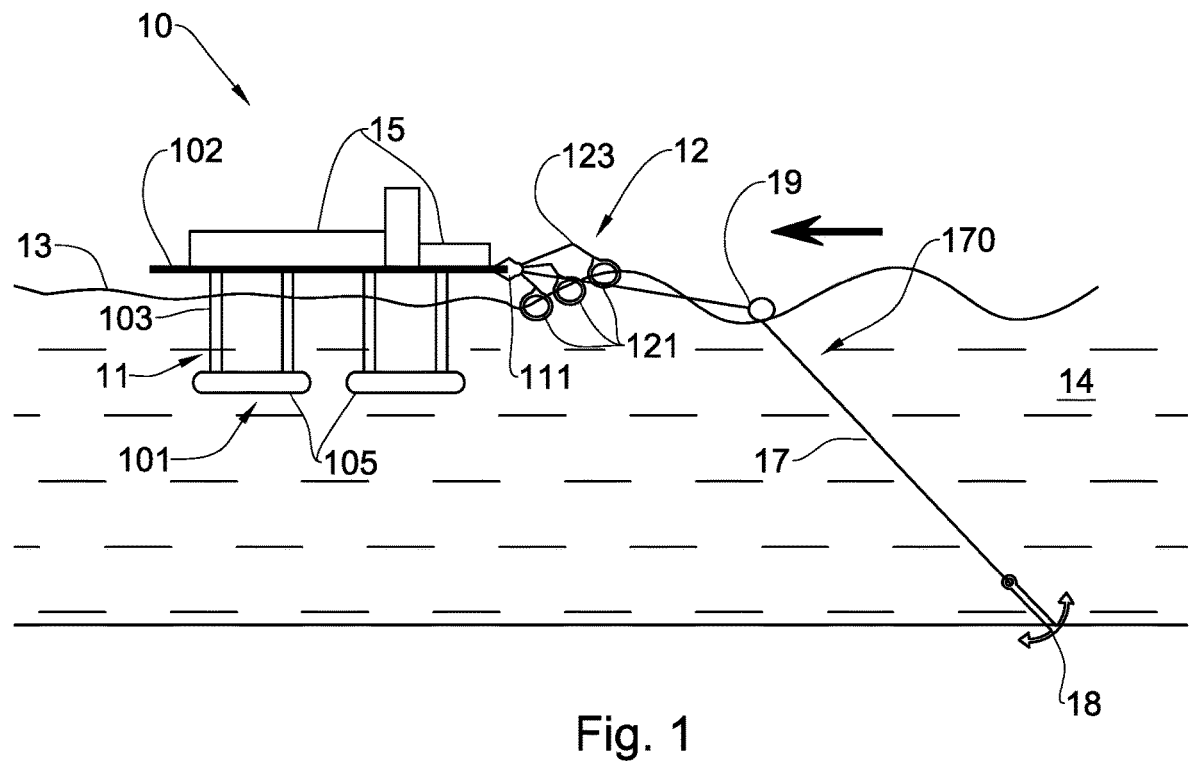
FIG. 1 illustrates an elevational side view and a top view of a floating structure disposed at a water surface, according to an embodiment of the present invention.

The principles and operation of the floating structure according to the present invention may be better understood with reference to the drawings and the accompanying description, it being understood that these drawings and examples in the description are given for illustrative purposes only and are not meant to be limiting. It is to be understood that these drawings, which are not necessarily to scale, are given for illustrative purposes only and are not intended to limit the scope of the invention. For example, the dimensions of some of the elements in the figures may be exaggerated relative to other elements to help improve understanding of various embodiments. The same reference numerals and alphabetic characters will be utilized for identifying those components which are common in the floating structure and its components shown in the drawings throughout the present description of the invention.

Figure 2:
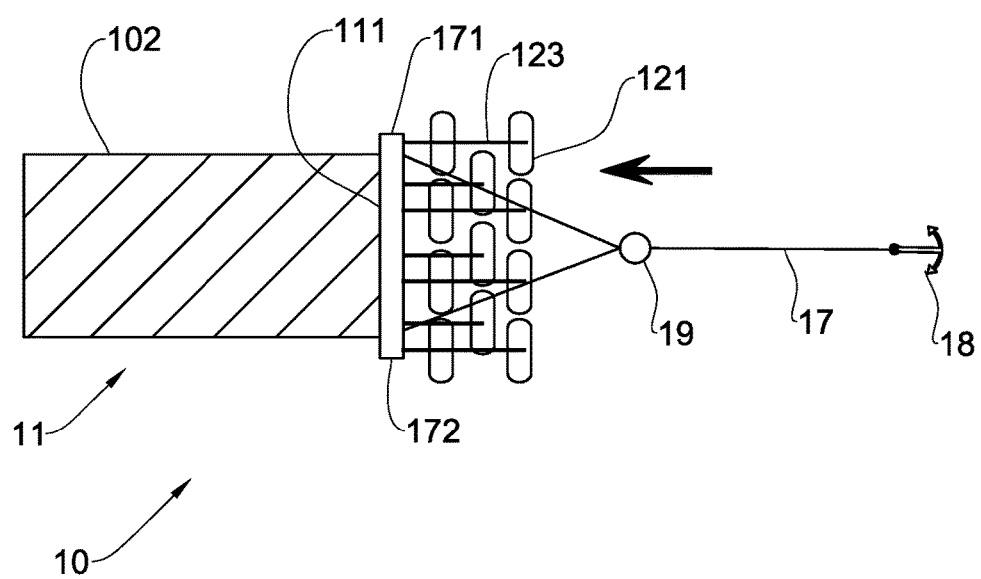
FIG. 2 illustrates a top view of the floating structure shown in FIG. 1.

Referring to FIGS. 1 and 2 together, an elevational side view and a top view of a floating structure 10 disposed at a water surface 13 of a water body (such as oceans, sea or lakes) 14 are illustrated, according to an embodiment of the present invention. The floating structure 10 includes a floating platform 11, a mooring system 170 configured for mooring the floating platform at its one side 111 to a sea floor 16, and a damping system 12 arranged at one side of the floating platform 11 configured for damping storm waves and affording greater stability of the entire floating structure 10.

According to an embodiment of the present invention, the floating platform 11 is a semi-submersible platform that includes a floating base 101 disposed under the water surface 13 and a deck 102 supported by strut elements 103 extending from the floating base 101. For example, the outline of the semi-submersible platform 11 can be rectangular with length in the range of 500 meters to 2000 meters and width in the range of 100 meters to 500 meters, however other outline shapes are also contemplated.

The floating base 101 is disposed under the water surface 13 and configured for holding the deck 102 and a desired payload (e.g., equipment and facilities) 15, which is mounted on the deck 102 for industrial activity and urban life.

According to an embodiment of the present invention, the floating base 101 includes a plurality of removable buoyancy units 105 connected to the deck 102 via the strut elements 103. Each buoyancy unit 105 includes a pontoon configured to displace enough water in order to create a buoying force greatly in excess of weight of the buoyancy unit. If any of these buoyancy units 105 are damaged or become defective, the defective units can be readily repaired or replaced. This configuration can, for example, be achieved by construction of the buoyancy units from lightweight pre-stressed and post tensioned concrete; however it could be also designed and constructed in steel or, for smaller scale structures, from fiberglass or any other suitable material. When desired, the pontoons of the buoyancy units 105 may be configured to have a hollow body filled with a filler material to provide sufficient weight therefor. The filler material may include metals, concrete, polymeric materials, nontoxic construction disposals such as bricks, rocks, pebbles, glass, ceramics, sand and so forth.

The size, shape and weight of the buoyancy units 105 are governed by the size, shape and weight of the deck 102 and equipment being supported on the deck. For example, size of the buoyancy units 105 can be in the range of 1 meter to 50 meters and weight in the range of 100 kg and tens tons.

The number and concentration of the buoyancy units 105 is preferably such that the entire volume of the buoyancy units or at least most of its volume (e.g., more than 80%) are well below the area of wave action, e.g. at a depth below the water surface of about 10 meters to 30 meters. The strut elements 103 can be made of a suitable material and have a required configuration and cross-section area to provide a suitable strength in order to maintain the deck 102 with a desired industrial and dwelling infrastructure. For example, the strut elements 103 can be formed from steel tubes, concrete columns, etc. The number and concentration of the strut elements are governed by the size and weight of the deck 102 and equipment being supported. Preferably, the strut elements 103 have a suitable length to provide sufficient clearance over the water surface 13 to meet the requirement that relatively small waves with a height of less than about 10 meters do not reach the deck 102 or at least do not effectively disturb operation of the equipment and facilities mounted on the deck. When desired, the strut elements may be implemented inform hollow pipes to provide additional buoyancy to the structure.

In this embodiment, unlike floating barge platforms, which are constantly affected by surface wave action, the buoyant floating base 101 of the semi-submersible platform 11 is well below the surface wave action. Likewise, the deck 102 of the semi-submersible platform 11 is well above the energy of the wave action. The only part of the platform modules subject to the forces of wave or swell action is a narrow segment of the pipes or columns of the strut elements 103 that is small relative to the total areas of the floating base 101 and the deck 102.

The floating structure 10 is moored to the sea floor 16 by using the mooring system 170 at one side 111 of the floating structure 10. This permits rotation of the floating structure 10 to provide a desired orientation down-wind with respect to an anchor point 18. The direction of the wind is shown in FIGS. 1 and 2 by an arrow.

According to an embodiment of the present invention, the mooring system 170 includes an anchor 180 resting on the sea floor, an anchor-connecting element 17 configured for providing connection of the floating platform to the anchor 180, and a shock absorbance buoy 19.

It should be understood that the anchor 180 may be implemented in different ways, depending on the conditions at the location of the anchor point 18, such as the wind, stream flow, sea floor structure, etc. The type of the anchor 180 depends on the type of the floating structure 10, its weight, dimensions, etc.

The purpose of the shock absorbance buoy 19 is to assist in carrying the weight of the anchor-connecting element 17 and to absorb the wave shock associated with impact of the incoming waves and/or wind. The anchor-connecting element 17 may be a cable, a chain, a wire rope, a flexible tube, or the like, and can be made of materials such as metals, polymeric materials and so forth.

According to the embodiment shown in FIG. 1, the anchor-connecting element 17 is connected to the shock absorbance buoy 19 and extends downwardly therefrom to the sea floor 16, where it is secured thereto at its lower end by using the anchor 180 resting on the sea floor at the anchor point 18 or by any other suitable mechanism. The shock absorbance buoy 19 is connected to ends 171 and 172 of the semi-submersible platform 11 which are both located at the side 111 of the platform 11 to provide a desired orientation down-wind with respect to the anchor point 18.

It should be noted that for relatively small floating structures (e.g., for the structures with a length less than 500 meters and a width less than 100 meters) and for sea water depth less than 150 meters, mooring of the floating platform can be achieved by using a single-point anchoring system (not shown). The single-point anchoring system includes an anchor-connecting element that directly connects the anchor 180 to the side 111 of the platform 11 at a single point (preferably in the middle of the side 111), i.e. without a shock absorbance buoy.

In order to stabilize in the horizontal position of the floating platform structure 10 at a certain height above the sea level and avoid pitch and roll motion, the damping system 12 is arranged at the side 111 of the semi-submersible platform 11 where the shock absorbance buoy 19 is connected to the ends 171 and 172. As described above, this side is always oriented to face the incoming wind and the waves created by the wind.

The damping system 12 is configured for absorbing the wave energy and the stresses imparted by the motion of the incoming waves in order to stabilize a horizontal position of the floating structure 10 during a storm. According to an embodiment of the present invention, the damping system 12 includes a set of floating bodies 121, which are configured to roll (i.e. to float up and down) independently along with the waves on the water surface and at a depth where wave action is most prevalent. The floating bodies 121 are arranged in rows, which are parallel to the side 111 and are perpendicular to the direction of the incoming waves. The rows extend apart from the side 111 along the direction of the incoming waves. Each row includes a plurality of floating bodies 121. In each row, the floating bodies 121 are shifted with respect to the floating bodies 121 of the neighboring rows to provide shielding of the side 111 from direct impact of the incoming waves. The floating bodies 121 are connected to a rotary shaft 122 arranged on the semi-submersible platform 11 by using levers 123. Each lever 123 has a suitable shape in order to be connected to the corresponding floating body 121 at one end of the lever 123 and to the rotary shaft 122 at its other end to provide pivotal motion along an axis of the rotary shaft 122.

According to an embodiment of the present invention, each floating body 121 is independent from the others and includes a pontoon configured to displace enough water in order to create a buoying force. If any of these floating bodies 121 are damaged or become defective, the defective bodies can be readily repaired or replaced. This configuration can, for example, be achieved by construction of the buoyancy bodies from pre-stressed and post tensioned concrete; however it could be also designed and constructed in steel or, for smaller scale structures, from fiberglass or any other suitable material. When desired, the pontoons of the floating bodies 121 may be configured to have a hollow body to provide sufficient weight therefor.

The size, shape and weight of the floating bodies 121 are governed by the condition to absorb maximum energy of the striking waves. For example, the floating bodies 121 can have a cylindrical shape with a diameter in the cross-section area of the cylinder in the range of 1 meter to 5 meters and a length of the cylinders in the range of 1 meter to 10 meters.

The weight of the floating bodies 121 should be sufficient for absorbing the energy of the strong waves by transferring it in the potential energy of the floating bodies 121 when they are lifted up. For example, the weight of the floating bodies 121 can be in the range of 100 kg and 10 tons.

The number the floating bodies 121 in each row is governed by the length of the side 111. In turn, the number of the rows extending from the side 111 is governed by the length of the incoming waves. This number should be sufficient to provide desired shielding and stabilization of the floating structure. For example, the number of the rows can be in the range of 1 to 6, while the number of the floating bodies 121 in the rows can be in the range of 1 to 50.

Moreover, in order to achieve a maximal efficiency of operation of the damping system 12 during a strong storm and harsh weather conditions, the floating bodies 121 of at least one or more rows should be located on the crests of the incoming waves and the floating bodies 121 of at least one or more rows should be located on the troughs of the incoming waves. For example, for waves with a wavelength in the range of 10 meters to 20 meters, this provision can be achieved when the number of the rows is in the range of 2 to 6.

The damping system 12 of the floating structure 10 of the present invention can also be used for converting the energy of the striking waves into usable energy onboard.

According to an embodiment, the floating structure 10 may include a hydraulic and/or pneumatic displacement device (not shown) actuated by the oscillations and pivotal motion of the levers 123, and adapted to pump water and/or air from the water body 14 and/or from the atmosphere under pressure into a reservoir (not shown) arranged on the deck 102, thereby storing the water and or air for future use to convert its potential energy into electrical energy through a turbine-driven generator (not shown). According to another embodiment, the floating structure 10 can include a turbine (not shown) actuated by displacement of the levers 123 and directly connected to a generator (not shown) for producing electricity to be used online or stored in electric al batteries.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

It should be understood that the features of the invention are not bound to any particular application of the floating structure, and are equally applicable to any large-scale floating platforms.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A floating structure, comprising:
   a floating platform disposed at a water surface;
   a mooring system configured for mooring one side of the floating platform to a sea floor, to thereby permit rotation of the floating structure and to provide a desired orientation down-wind with respect to an anchor point; and
   a damping system arranged at said one side of the floating platform and configured for absorbing wave energy and stresses imparted by motion of waves in order to stabilize a horizontal position of the floating structure during a storm,
   wherein the mooring system includes an anchor resting on the sea floor, an anchor-connecting element configured for providing connection of the floating platform to the anchor; and a shock absorbance buoy configured to assist in carrying the weight of the anchor-connecting element and to absorb the wave shock associated with the impact of incoming waves.

2. The floating structure of claim 1, wherein the floating platform includes:
   a deck disposed above the water surface and having a desired payload for industrial activity and urban life;
   a floating base disposed under the water surface, and configured for holding the deck; and
   strut elements extending from the floating base and configured for supporting the deck under the water surface.

3. The floating structure of claim 2, wherein the floating base includes a plurality of buoyancy units connected to the deck via the strut elements and includes a pontoon configured to displace enough water in order to create a buoying force substantially in excess of a weight of the buoyancy unit.

4. The floating structure of claim 3, wherein a number and a concentration of the buoyancy units is such that an entire volume of the buoyancy units is well below an area of wave action.

5. The floating structure of claim 2, wherein the strut elements have a suitable length to provide sufficient clearance over the water surface to meet a requirement that waves with a height of less than about 10 meters do not reach the deck.

6. The floating structure of claim 1, wherein the mooring system includes a single-point anchoring system including an anchor resting on the sea floor, and anchor-connecting element configured for providing direct connection of the floating platform to the anchor.

7. The floating structure of claim 1, wherein the anchor-connecting element is connected to the shock absorbance buoy and extends downwardly therefrom to the sea floor, where the anchor-connecting element is secured thereto at a lower end thereof by using the anchor resting on the sea floor at the anchor point.

8. The floating structure of claim 7, wherein the shock absorbance buoy is connected to opposite ends of said one side of the semi-submersible platform, thereby to provide a desired orientation down-wind with respect to the anchor point.

9. The floating structure of claim 1, wherein the damping system includes a set of floating bodies configured to float up and down independently along with the waves on the water surface and at a depth where wave action is most prevalent.

10. The floating structure of claim 9, wherein the set of floating bodies are arranged in rows that are parallel to said one side of the floating structure and are perpendicular to a direction of the incoming waves, the rows extending apart from said one side along the direction of the incoming waves.

11. A floating structure, comprising:
a floating platform disposed at a water surface;
a mooring system configured for mooring one side of the floating platform to a sea floor, to thereby permit rotation of the floating structure and to provide a desired orientation down-wind with respect to an anchor point; and
a damping system arranged at said one side of the floating platform and configured for absorbing wave energy and stresses imparted by motion of waves in order to stabilize a horizontal position of the floating structure during a storm,
wherein the damping system includes a set of floating bodies configured to float up and down independently along with the waves on the water surface and at a depth where wave action is most prevalent;
wherein the set of floating bodies are arranged in rows that are parallel to said one side of the floating structure and are perpendicular to a direction of the incoming waves, the rows extending apart from said one side along the direction of the incoming waves; and
wherein each of the rows includes a plurality of floating bodies.

12. The floating structure of claim 11, wherein, in each of the rows, the floating bodies are shifted with respect to the floating bodies of the neighboring rows to provide shielding of said one side from direct impact of the incoming waves.

13. A floating structure, comprising:
a floating platform disposed at a water surface;
a mooring system configured for mooring one side of the floating platform to a sea floor, to thereby permit rotation of the floating structure and to provide a desired orientation down-wind with respect to an anchor point; and
a damping system arranged at said one side of the floating platform and configured for absorbing wave energy and stresses imparted by motion of waves in order to stabilize a horizontal position of the floating structure during a storm,
wherein the damping system includes a set of floating bodies configured to float up and down independently along with the waves on the water surface and at a depth where wave action is most prevalent;
wherein the damping system includes levers associated with the set of floating bodies and a rotary shaft arranged on the semi-submersible platform, wherein the set of floating bodies are connected to the rotary shaft by using the levers, each of the levers has a suitable shape to be connected to the corresponding floating body at one end of the lever and to the rotary shaft at another end thereof, thereby to provide pivotal motion along an axis of the rotary shaft.

14. The floating structure of claim 13, wherein each of the floating bodies have a cylindrical shape with a size in the cross-section area of the cylinder in a range of 1 meter to 50 meters and a length of the cylinders in a range of 1 meter to 100 meters.

15. The floating structure of claim 13, wherein a weight of each of the floating bodies is in a range of 100 kg and 1000 tons.

16. The floating structure of claim 11, wherein a number the floating bodies in each of the rows is governed by the length of the side, while a number of the rows extending from said one side of the floating structure is governed by the length of the incoming waves.

17. The floating structure of claim 13, wherein at least one floating body of the set of floating bodies is located on a crest of incoming waves and at least one another floating body of the set of floating bodies is located on troughs of the incoming waves.

18. The floating structure of claim 16, wherein the number of the rows is in a range of 1 to 6.

* * * * *